United States Patent [19] [11] 4,163,571
Nash [45] Aug. 7, 1979

[54] PIPE COUPLINGS

[75] Inventor: David D. Nash, Brownhills West, England

[73] Assignee: Durapipe Limited, Cannock, England

[21] Appl. No.: 816,642

[22] Filed: Jul. 18, 1977

[51] Int. Cl.² ............................................. F16L 17/04
[52] U.S. Cl. ................................... 285/106; 285/112; 285/184; 285/367
[58] Field of Search ........ 285/106, 112, 184, 363–367, 285/407–411

[56] References Cited

U.S. PATENT DOCUMENTS

| 1,854,855 | 4/1932 | Nakashima | 285/106 |
| 2,581,047 | 1/1952 | Salmond et al. | 285/184 X |

FOREIGN PATENT DOCUMENTS

| 701311 | 1/1965 | Canada | 285/112 |
| 805469 | 5/1951 | Fed. Rep. of Germany | 285/184 |
| 2306642 | 9/1974 | Fed. Rep. of Germany | 285/184 |
| 964665 | 2/1950 | France | 285/184 |

Primary Examiner—Dave W. Arola
Attorney, Agent, or Firm—Burns, Doane, Swecker & Mathis

[57] ABSTRACT

A pipe coupling is disclosed in which two identical tubular parts, to receive pipe ends, each have a flange at one end thereof and are held together, via their flanges, by a clamping ring which has a radially inwardly facing groove which receives the flanges. Each flange on its side remote from the other flange slopes outwardly from the periphery of the tubular part towards said one end thereof providing a ramp surface engaged by the free edge of a respective one of the two side walls of the inwardly facing groove of the clamping ring so that a circumferential tension in the clamping ring produces a wedging action urging the flanges into engagement with each other. In a variant each of the two tubular parts is angled with respect to its end flange so that by adjusting the tubular parts relative to each other about the common axes of their flanges, the angle between the axes of the main portions of the tubular parts can be adjusted, thus providing a pipe bend of adjustable angle.

7 Claims, 8 Drawing Figures

PIPE COUPLINGS

This invention relates to pipe couplings and more particularly to a pipe coupling of the kind comprising two tubular parts, each provided at one end with a formation for connection with the corresponding formation of the other tubular part, for example couplings of the type in which each of the two tubular parts is provided with a flange at said one end, and in which the two tubular parts are held together with the end faces of their flanges facing each other, by a clamping ring encircling the tubular parts and having an internal groove which receives the flanges, the pipe coupling including a resilient annular seal.

In known pipe couplings of this type, in order to accommodate manufacturing tolerances, the width, measured axially, of the internal groove in the clamping ring must be made somewhat greater than the combined width, measured axially, of the two flanges of the tubular parts, and as a result there is normally a gap between the adjoining end faces of the flange. The annular seal has a shape, in axial section, such that fluid under pressure within the tubular parts, escaping through the gap between the flanges, expands the seal against the clamping ring and against the peripheral surfaces of the flanges and thus prevents the escape of the fluid from the coupling. However, if, as frequently occurs in practice, the two tubular parts are not quite coaxial, then each flange may bear upon the clamping ring at only one point, resulting in the flange and clamping ring being subjected to high mechanical stresses at that point, which may lead to damage to the parts, or distortion thereof, with a consequent failure of the seal to operate effectively.

It is an object of the present invention, in one of its aspects, to provide an improved pipe coupling of the above noted type.

According to this aspect of the present invention there is provided a pipe coupling comprising two tubular parts each provided with a flange at one end, a clamping ring having an internal groove adapted to receive the flanges when the two tubular parts are disposed in end to end relationship with their flanges together, the coupling including an annular seal adapted to provide sealing between the tubular parts, and wherein at least one of the flanges, in axial section through the respective tubular part, on its side which faces away from said one end of the tubular part, slopes outwardly from the periphery of the tubular part towards said one end thereof, and/or at least one side wall of the groove in the tubular clamping ring, in axial section through the clamping ring, slopes towards the other side wall of the groove in a direction away from the axis of the clamping ring, whereby, when the coupling is assembled, a circumferential tension in the clamping ring produces a wedging action urging one flange into engagement, via the end face of its flange, with the end of the other flange.

By virtue of this construction, variations in the axial dimensions of flanges and clamping rings due to manufacturing tolerances etc., can be taken up by tightening the clamping ring to the required degree to ensure that the end faces of the flanges are firmly in engagement with each other so that the tubular parts are substantially coaxial with each other and so that the clamping ring can engage each flange all round the tubular parts thus avoiding the localised stresses which can occur with prior art pipe couplings.

Preferably the annular seal is in the form of a resilient, e.g. elastomeric element which in axial section has the form of a channel, open on the radially inner side of the element and has a restricted mouth defined between two lips in the form of flanges extending towards each other from the side of said channel, the annular seal, in the assembled pipe coupling, being accommodated between the bottom of the groove in the clamping ring and the peripheral surfaces of the flanges of the tubular parts with each lip engaging the peripheral surface of a respective one of the flanges and the junction between the flanges in the zone of the restricted mouth of the seal, whereby fluid under pressure within the tubular parts, escaping between the end faces of the flanges thereof will tend to inflate the seal and thus urge said lips even more firmly into sealing engagement with the peripheral surfaces of the flanges of the tubular parts.

Preferably, in order to assist this inflating action on the seal, the end face of the flange of each tubular part is provided with at least one groove extending thereacross from the radially inner to the radially outer edge of the flange, the or each said groove providing a passage for fluid within the tubular parts to the interior of the seal.

The invention in another of its aspects relates to a pipe coupling for connecting adjacent ends of pipes which have their axes inclined with respect to one another.

In laying a pipe line comprising interconnected rigid pipes along a path which includes bends, difficulties arise in following the bends, since in general it is not desirable or practicable to attempt to bend an initially straight length of pipe to conform with a bend, and so it is necessary to employ relatively short tubular connecting pieces formed with a bend in manufacture.

However, for reasons of manufacturing economy it is impracticable to manufacture such preformed tubular connecting pieces with bends of more than a few standard angles, so that the path of such a pipe line must be adapted to a form obtainable by use of the standard fittings and therefore a path for the pipe line must frequently be chosen which is neither the most economical nor the most convenient in other respects. It is an object of the present invention to provide a pipe coupling for use in a bend in a pipeline, which is adaptable to bends of a range of different angles.

According to this aspect of the invention there is provided a pipe coupling comprising two tubular parts each having a first end portion sealingly connectable with the first end portion of the other said part in a plurality of angular positions with respect to the other said part about a first axis coincident with the first axis of the other said part, each said tubular part having a second end portion adapted for sealing connection with a pipe and defining a second axis, which when a pipe is connected thereto corresponds to the axis of the latter pipe, said second axis of each said tubular part being inclined with respect to the first axis thereof, the arrangement being such that with said first end portions sealingly connected with each other, in any angular position with respect to each other about their coincident first axes, said second axes of said tubular portions intersect at a point on the coincident said first axes or pass a common point on the coincident first axes at a distance small in relation to the diameter of said tubular portions.

Preferably the coupling is such that prior to final fixing of the two tubular portions with respect to each other they can be rotated with respect to each other about their coincident first axes and can subsequently be fixed with respect to each other so as to provide a sealed connection between the two portions, in any angle with respect to each other about their coincident first axes.

Preferably said first end portion of each said tubular part comprises a flange at the respective end of the tubular part, and in the assembled coupling the two tubular parts are held together, with the end faces of their flanges facing each other, by a clamping ring encircling the tubular parts and having an internal groove which receives the flanges, the pipe coupling including a resilient annular seal, the end faces of said flanges being normal to the first axes of the respective tubular parts.

According to a yet further aspect of the invention there is provided a pipe fitting in the form of a tubular part adapted for incorporation, with an identical tubular part, in a pipe coupling according to the preceding aspect of the invention, the tubular part comprising a first end portion having a substantially annular flat face for engagement with a corresponding face of an identical tubular part and a second end portion comprising a tubular portion the axis of which is inclined with respect to said flat face and intersects the plane of the latter at a point corresponding to the centre of the annulus defined by said flat face or at a point the spacing of which from the last mentioned centre is small in relation to the diameter of the tubular part.

Embodiments of the invention are described below with reference to the accompanying drawings in which.

Figure 1:
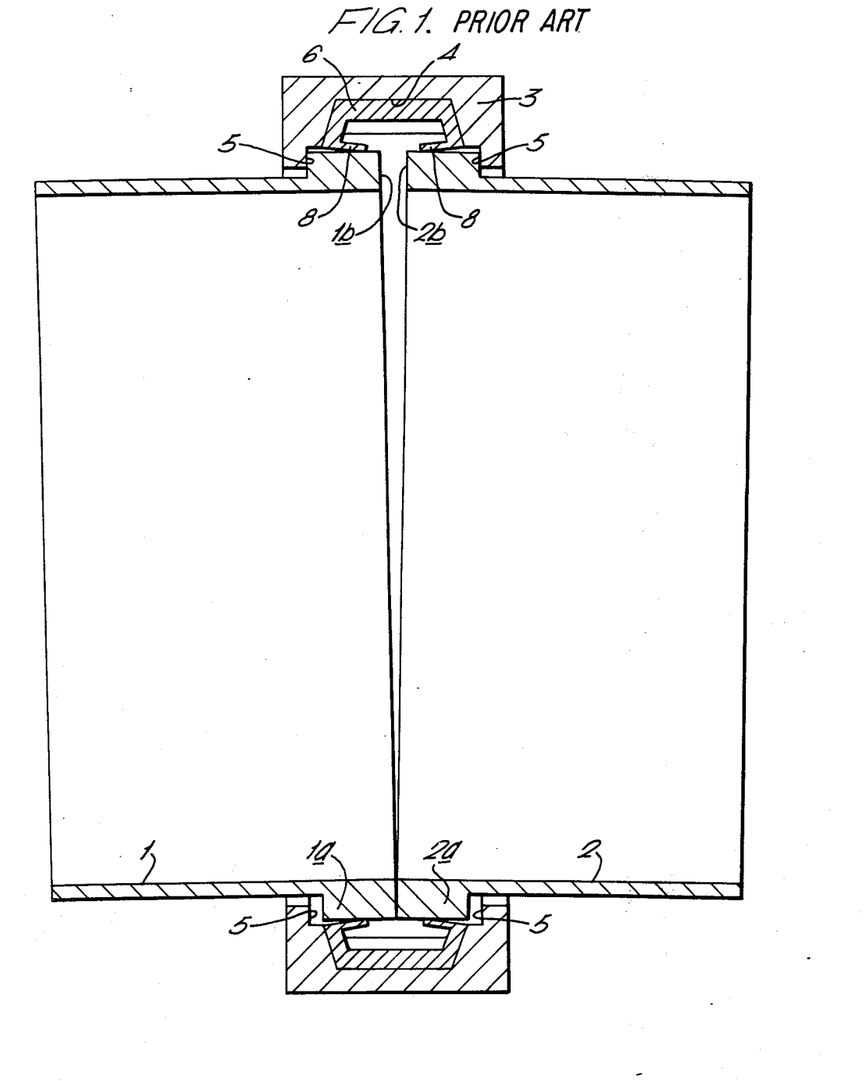
FIG. 1 is a longitudinal sectional view of a prior art pipe coupling.

FIG. 1 shows a typical prior art coupling. This pipe coupling comprises identical tubular parts 1 and 2, each adapted to receive and be secured to, e.g. by adhesive, a respective end part of a respective one of two pipes to be coupled. Each part, 1 and 2 is of uniform circular cross-section over most of its length and has at one end a flange 1a, 2a, extending radially outwardly from the exterior of the tubular part. Each flange has a planar end face 1b, 2b at the end of the respective tubular part and perpendicular to the axis of the latter, and defining one axial limit of the flange and has a parallel end face, facing away from the adjacent end of the respective tubular part. The parts 1 and 2 are held together with their faces 1b, 2b facing each other, by a clamping ring 3, formed for example in two semicircular halves clamped together by bolts.

The ring 3 has an internal circumferential groove 4, a radially inner part of which receives the flanges 1a, 2a, the flanges being confined axially between side wall parts 5 of the groove 4, the side wall parts 5 lying in planes perpendicular to the axis of ring 3. A resilient seal 6, of the cross-sectional shape shown, is accommodated within a bottom part of the groove 4 between the bottom of the groove and the cylindrical peripheral surfaces of the flanges 1a, 2a. The seal has the form of a channel open on its radially inner side, and having a restricted mouth defined between lips 8, each of which engages the peripheral surface of a respective one of the flanges 1a, 2a. The seal 6 is intended to be inflated by fluid under pressure escaping from within the pipes coupled between the faces 1b, 2b so as to urge the lips 8 firmly into sealing engagement with the respective flanges 1a, 2a.

In order to accommodate variations in dimensions of the parts due to manufacturing tolerances etc., it is necessary to ensure that the axial spacing between side wall parts 5 is great enough to accommodate two of the axially widest flanges 1a, 2a which can be encountered, and therefore in a typical case the axial spacing between side wall parts 5 will be considerably greater than the combined axial width of flanges 1a, 2a. As a result there is considerable play in the coupling and it may easily arise that the axes of parts 1 and 2 are tilted with respect to each other, as shown in FIG. 1, so that flanges 1a, 2a engage each other at only one point (shown at the bottom of FIG. 1), and each flange 1a, 2a engages the respective side wall part 5 at only one point, (at the top of FIG. 1). As a result the flanges 1a, 2a and the ring 3 are subjected to localised but possibly severe stresses which tend to distort the flanges and the ring 3, and may lead to damage, such as distortion or even fracture.

Figure 2:
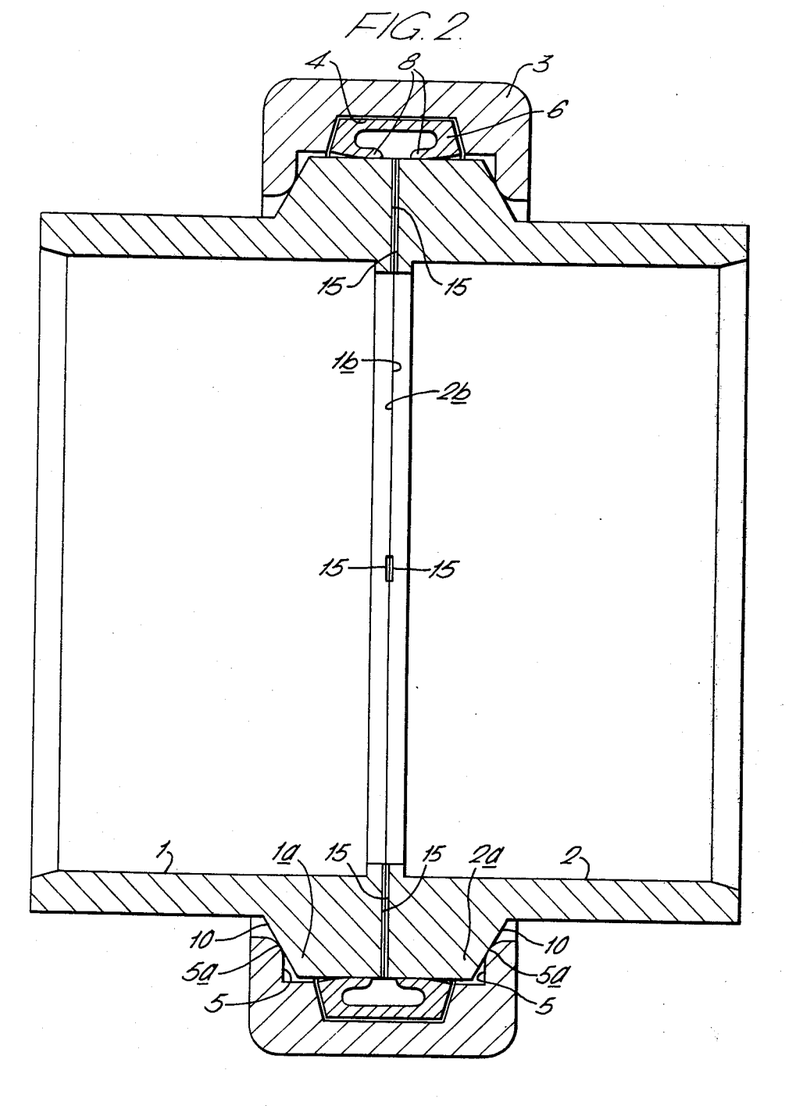
FIG. 2 is a view, corresponding to FIG. 1, of a first form of pipe coupling embodying the invention.

FIG. 2 is an axial section view, similar to FIG. 1, but showing a pipe coupling forming an embodiment of the present invention. In FIG. 2 parts corresponding to those in FIG. 1 have the same reference numerals.

The pipe coupling shown in FIG. 2 is similar to that shown in FIG. 1, the principal difference being that the face 10 of each flange 1a, 2a which faces away from the adjacent end of the respective tubular part 1a, 2a is not planar and perpendicular to the axis of the pipe part, as in FIG. 1, but is frusto-conical in form so that in axial section, as shown, each said face 10 slopes outwardly from the cylindrical exterior surface of the major portion of the respective part 1, 2 towards the end face 1b, 2b, of the respective flange. Furthermore, the radially inner edge of each side wall part 5 of the clamping ring 3 is radiussed as indicated at 5a, each radiussed edge 5a bearing upon the sloping face 10 of the respective flange 1a, 2a.

Thus when the ring 3 of FIG. 2 is tightened, the wedging action between the sloping faces 10 and the respective edges 5a forces the flanges 1a, 2a, in opposite axial directions, forcing the end faces 1b, 2b of the flanges into full engagement with each other, while because the parts 1, 2 and 3 remain in axial alignment, each flange 1a, 2a is engaged by a respective edge 5a all round the coupling and not merely at one point. The radial extent of the side walls 5 is, of course, such that despite manufacturing tolerances, the faces 1b, 2b are forced into engagement with each other while there is still radial clearance between the ring 3 and the cylindrical peripheral surfaces of the flanges 1a, 2a. The fact that the edges 5a of the clamping ring are radiussed is significant, since this feature, in conjunction with the slopes of the faces 10, ensures that each edge 5a makes linear contact with the respective face 10 along a continuous line extending entirely around the respective flange 1a, 2a.

Figure 3:
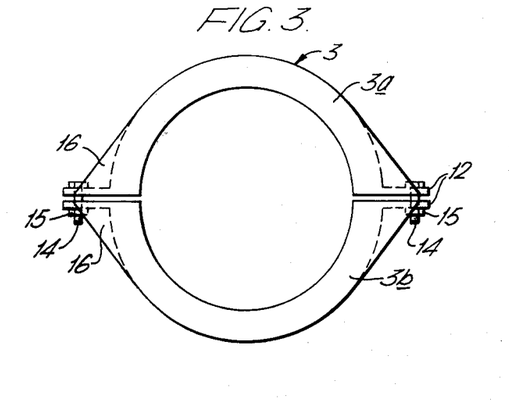
FIG. 3 is an elevation view, looking in the axial direction, of a clamping ring forming part of the embodiment of FIG. 2.

FIG. 3 is an elevation view of the clamping ring 3 of FIG. 2, viewed in the axial direction. As with the ring 3 of FIG. 1, the ring 3 of FIG. 2 comprises two generally semi-circular parts 3a and 3b having at their ends respective lugs 12 extending radially outwardly from the body of the respective parts 3a, 3b provided with holes through which pass bolts 14, on which are engaged nuts 15, by means of which the parts 3a, 3b can be drawn together to tighten the ring 3 about the flanges of the parts 1 and 2 (not shown in FIG. 3). Gussets 16 extend between the body of each ring part 3a, 3b and each of the respective lugs 12, one gusset 16 being provided at each axial end of each lug 12, so that each nut 15 and the head of each bolt 14 is located axially (at least in part) between two axially spaced gussets 16.

The clamping ring 3 described with reference to FIGS. 2 and 3 is, of course, only one example of the various kinds of clamping ring which may be used.

Figure 4:
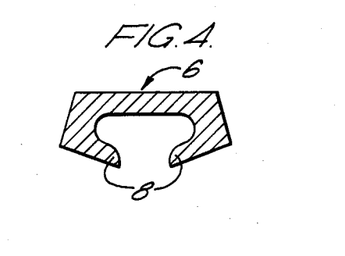
FIG. 4 is a sectional view of a seal forming part of the embodiment of FIG. 2.

The seal 6 in the embodiment of FIG. 2 is of substantially the same form as the seal 6 in the coupling of FIG. 1. FIG. 4 shows the cross-sectional shape of the seal 6 in the unstressed condition, i.e. before fitting in the coupling. It will be noted, by comparison with FIG. 2, that in the installed state the lips 8 are already resiliently flexed radially outwardly from their unstressed positions, even without any pressurized fluid within the seal, and thus bear sealingly against the peripheral surfaces of the flanges 1a, 2a.

Since, in the coupling of FIG. 2, the faces 1b, 2b of the flanges 1a, 2a are held permanently in engagement with each other, in order to ensure that pressurized fluid from within the parts 1 and 2 can pass to the interior of the seal 6, each end face 1b, 2b is provided with one or more shallow grooves 15 extending radially from the inner to the outer edge of the end face 1b, 2b.

Figure 5:
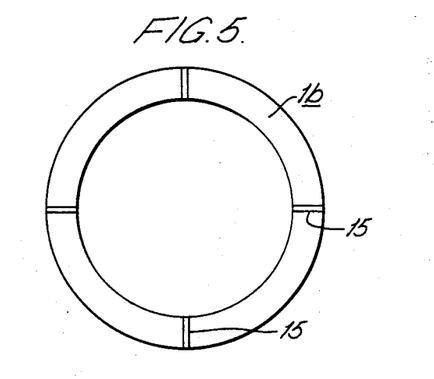
FIG. 5 is an end view looking in the axial direction, of one of the tubular parts of the embodiment of FIG. 2.

In FIG. 5, which shows an elevation view, looking in the axial direction, of the end face 1b, four such grooves 15, spaced at 90° intervals about the axis of the pipe part, are shown.

Figure 6:
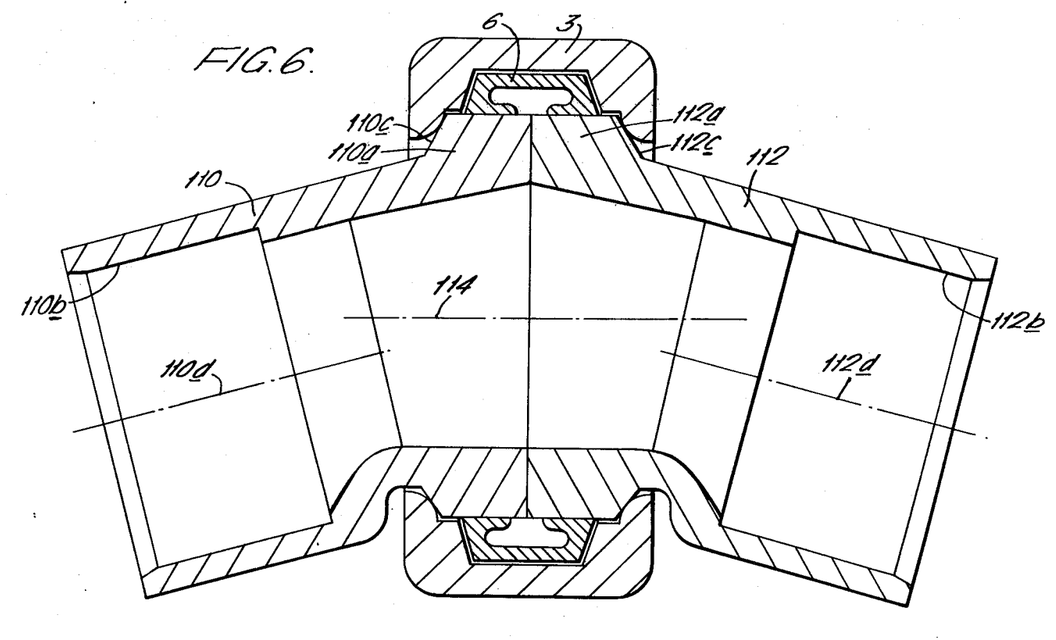
FIG. 6 is a longitudinal sectional view of a pipe coupling forming another embodiment of the present invention.

Referring to FIG. 6, the adjustable coupling shown comprises two identical tubular parts 110 and 112 having first end portions thereof provided with annular flanges 110a and 112a respectively and having second end portions thereof formed with sockets 110b and 112b respectively.

The flanges 110a and 112a have each an external form the same as that of the flanges 1a, 2a of FIG. 2 and have each a planar end face of the same form as the end face 1b, 2b and thus having radial grooves, corresponding to groove 15, extending thereacross.

The two parts 110 and 112 are held together via their flanges in exactly the same way as the parts 1 and 2 in FIG. 2 by means of a clamping ring 3 incorporating a seal 6, the ring 3 and the seal 6 being of the same form, and acting in the same way, as the correspondingly referenced parts in the coupling of FIGS. 2 to 5. The periphery of each flange 110a, 112a is provided by a cylindrical surface the longitudinal axis of which corresponds to a first axis of the respective tubular part, the said first axes of the two tubular parts being coincident in the assembled coupling and being indicated at 114 in FIG. 6. The sides 110c, 112c of the flanges are formed as respective conical surfaces each symmetrical about the respective first axes (114) and the annular end faces of the flanges are centred on said coincident first axes.

The socket 110b, 112b of each tubular part 110, 112 respectively is provided within a generally cylindrical portion of the respective tubular part, the axis of the last mentioned cylindrical part constituting a second axis 110d, 112d of the part 110 or 112 respectively, the internal wall of the respective socket 110b, 112b being cylindrical and having its axis coincident with the respective second axis 110d or 112d. The second axis 110d or 112d of each part 110 or 112 intersects the first axis 114 at a point in the plane of the planar end face of the respective flange 110a or 112a, that is to say in the centre of the annulus defined by the respective planar end face and since, in the assembled coupling, the planes of these end faces are also coincident, the axes 110d and 112d intersect each other and the axis 114 at a single point the position of which remains the same whatever the angle of one tubular part 110 or 112 with respect to the other about the axis 114. As a result, by rotating one tubular part 110 or 112 with respect to the other (112 or 110 respectively) about the axis 114, the angle of the axis 110d with respect to the axis 112d can be varied over a continuous range of angles in each of which the distance of the end of each socket 110b, 112b from the point of intersection of the axes 110d and 112d is the same, so that the coupling has all of the advantages of a bendable connecting piece without the disadvantages which would make a unitary bendable connecting piece impracticable.

Figure 7:
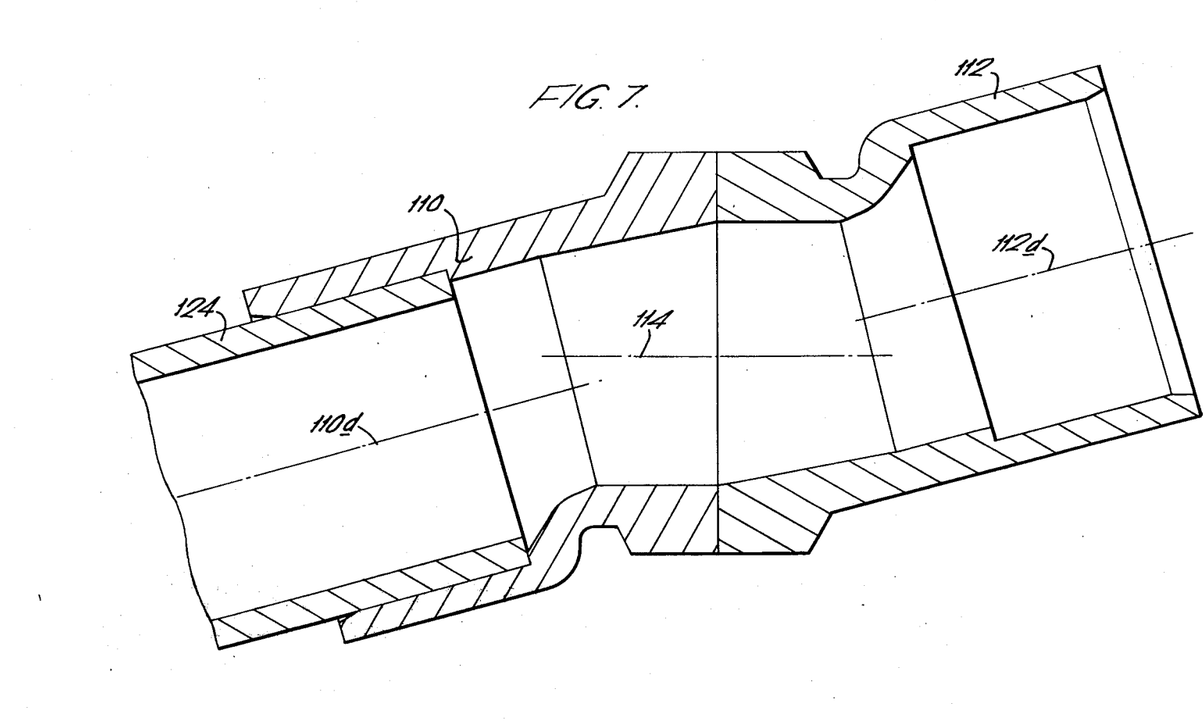
FIG. 7 is a view in longitudinal section of the coupling of FIG. 6 with the clamping ring and seal omitted, showing the two tubular parts of the coupling at a different angle with respect to each other as compared with FIG. 1.

In the embodiment shown, the axes 110d, 112d are each inclined at 15° with respect to the axis 114, so that by rotating the part 112, for example, with respect to the part 110 through an angle of 180° about the axis 114 from the position shown in FIG. 6 (in which the axes 110d, 112d and 114 all lie in a common plane), the inclination of the axis 112d with respect to the axis 110 can be varied continuously from 30° to 0°, an inclination of 0° corresponding to the state illustrated in FIG. 7 in which the axes 110d and 112d are coincident. Such rotation of one tubular part with respect to the other will, of course, not be readily effected when the clamping ring 116 is fully tightened, and the coupling is preferably adjusted to achieve the desired angle between the sockets 110b and 112b with the parts located somewhat loosely, before the clamping ring is tightened fully.

It will be evident that the range of angles obtainable between the sockets 110b and 112b may be increased by making the inclination of the second axis 110d, 112d with respect to the first axis of each part 10 or 12 respectively greater, but for large inclinations it may be necessary either to make each part 110, 112 longer and more complex in shape to avoid undue restriction of the flow cross-section, and/or to arrange the axes of the sockets with respect to the coincident axes 114 in such a way that the axes 110d, 112d do not intersect at the point of intersection of the axis 114 with the plane of the end faces of the flanges, but merely pass fairly close to the last mentioned point at a distance small in relation to the mean diameter of the tubular parts 110 and 112. In this case the axes of the sockets will in general not merely be inclined with respect to each other but will also be slightly laterally offset with respect to each other.

Figure 8:
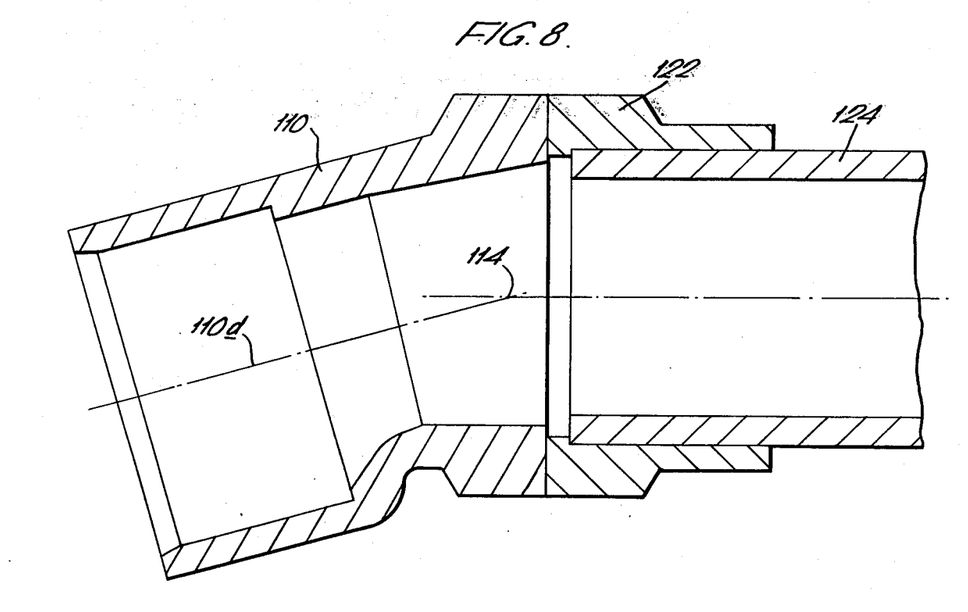
FIG. 8 is a longitudinal sectional view showing a coupling comprising one tubular member of the type shown in FIGS. 6 and 7 and one straight tubular member of the type shown in FIG. 2, the clamping ring and seal being again omitted.

FIG. 8 shows how one of the tubular parts which forms the coupling in FIG. 6, for example, the part 110 can be incorporated with a straight tubular part 122 (of the type used in the coupling of FIG. 2) to provide a composite connecting piece providing sockets for respective pipes, the angle between the sockets in this case being invariable. The part 110 and part 112 are held together via their flanges by means of a clamping ring of the same kind as shown in FIGS. 2, 3 and 6 incorporating a seal such as the seal 6 (the clamping ring and seal not being shown in FIG. 8) this being made possible by the fact that externally the flanges of the part 110 and part 112 are identical. FIGS. 7 and 8 show at 124 end portions of straight pipes received in one of the sockets of the respective coupling, the straight pipes being of an external diameter such as to fit closely within the respective sockets, and being, for example, fixed in the respective sockets by adhesive.

It will be appreciated that, while it is preferred that the flanges of the tubular parts of the couplings described and the clamping rings used incorporate the features of the coupling of FIGS. 2 to 5 so that the clamping ring serves to urge the flat planar faces of the flanges into engagement with each other, it would also be possible to form the flanges and clamping ring, in couplings similar to those of FIGS. 6, 7 and 8 in the manner known in the prior art for straight couplings, as described with reference to FIG. 1, so that the clamping ring merely serves to locate the flanges somewhat loosely with respect to each other and to hold the seal in place.

It will also be appreciated that, e.g. in the coupling of FIGS. 6 and 7, any other means of connecting the ends of the tubular parts, opposite from the ends which are to engage the pipes to be connected, may be employed which permits the tubular parts to be rotated with respect to each other about their common first axes and secured in any of a plurality of angular positions with respect to each other. For example the tubular parts might have cooperating flanges secured to each other by bolts passed parallel with their coincident first axes through holes provided in said flanges at regular angular intervals about said first axes. In this case, of course, only a limited number of predetermined angles between the pipes connected by the coupling would be obtainable, and assembly of the coupling would be far more time consuming than in the embodiments described with reference to the drawings.

The pipe coupling described with reference to the drawings is intended for pipe systems of thermoplastics materials and the parts 1, 2, 110, 112, and 3 of the coupling described being also of thermoplastics material. The invention is not of course confined to pipe systems of thermoplastics materials nor to couplings made of thermoplastics materials.

I claim:

1. A pipe coupling comprising two tubular parts each provided with a flange at one end, a clamping ring having an internal groove adapted to receive the flanges when the two tubular parts are disposed in end to end relationship with their flanges together, the coupling including an annular seal adapted to provide sealing between the tubular parts, and wherein each of said flanges, in axial section through the respective tubular part, on its side which faces away from said one end of the tubular part, slopes outwardly from the periphery of the tubular part towards said one end thereof, and wherein said internal groove in the clamping ring has side walls defining the axial limits of the groove, which over their regions furthest from the axis of the coupling and thus nearest the bottom of said internal groove, extend more steeply, with respect to the axis of the coupling, than said sloping sides of said flanges and which side walls, in axial section through the coupling, are radiused in the region of their free edges, whereby said side walls flare towards the edges of the groove and, over their regions nearest the axis of the coupling and thus furthest from the bottom of said internal groove, extend less steeply with respect to the axis of the coupling than said sloping sides of said flanges, whereby when the clamping ring is tensioned circumferentially, each said side wall of the groove engages the sloping side of the respective flange only along a continuous line of contact of the radiused part of the groove side wall with the respective flange and whereby when the coupling is assembled, a circumferential tension in the clamping ring produces a wedging action urging one flange into engagement, via the end face of its flange, with the end of the other flange.

2. The pipe coupling of claim 1 wherein the annular seal is a resilient element which has a radially outer channel, open on the radially inner side of the element, and has a restricted mouth defined between respective axially spaced apart side walls extending radially inwardly from axially extreme edges of said radially outer wall, and respective flanges extending towards each other from the radially inner edges of said side walls, whereby the annular seal, in axial section, has the form of a channel open on the radially inner side of the annular seal and having a restricted mouth defined between the free edges of said flanges of the annular seal, the last mentioned flanges forming the lips of said restricted mouth, the annular seal, in the assembled pipe coupling, being accommodated between the bottom of the groove in the clamping ring and the peripheral surfaces of the flanges of the tubular parts with each lip engaging the peripheral surface of the flange on a respective one of the tubular parts and with the junction between the flanges on the tubular parts being in the zone of the restricted mouth of the seal, whereby fluid under pressure within the tubular parts, escaping between the end faces of the flanges thereof will tend to inflate the seal and thus urge said lips even more firmly into sealing engagement with the peripheral surfaces of the flanges of the tubular parts.

3. The pipe coupling of claim 2 wherein said annular seal is an elastomeric element.

4. The pipe coupling of claim 2 wherein the end face of the flange of each tubular part is provided with at least one groove extending thereacross from the radially inner to the radially outer edge of the flange, said groove providing a passage for fluid within the tubular parts to the interior of the seal.

5. A pipe coupling comprising two tubular parts each having a first end portion provided with a flange at its free end, a clamping ring having an internal groove adapted to receive the flanges when the two tubular parts are disposed in end to end relationship with their flanges together, the coupling including an annular seal adapted to provide sealing between the tubular parts, and wherein at least one of said flanges, in axial section through the respective tubular part, on its side which faces away from said one end of the tubular part, slopes outwardly from the periphery of the tubular part towards said one end thereof whereby when the coupling is assembled and the clamping ring is untensioned, each said tubular part can be adjusted relative to the other to any of a plurality of angular positions with respect to the other about a first axis coincident with the first axis of the other said part, and whereby a circumferential tension in the clamping ring produces a wedging action urging one flange into engagement, via the end face of its flange, with the end of the other flange, to fix said two tubular parts with respect to each other, each said tubular part having a second end portion adapted for sealing connection with a pipe and defining a second axis which, when a pipe is connected thereto, corresponds to the axis of the latter pipe, said second axis of each said tubular part being inclined with respect to the first axis thereof, the arrangement being such that with said first end portions sealingly connected with each other, in any angular position of said first end portions with respect to each other about their coincident first axes, said second axes of said tubular parts pass a common point on the coincident first axes at a distance small in relation to the diameter of said tubular parts, wherein said internal groove in the clamping ring has side walls defining the axial limits of the groove, which over their regions furthest from the axis of the coupling and thus nearest the bottom of said internal groove, extend more steeply, with respect to the axis of the coupling, than said sloping sides of said flanges and which side walls, in axial section through the coupling, are radiused in the region of their free edges, whereby said side walls flare towards the edges of the groove and, over their regions nearest the axis of the coupling and thus furthest from the bottom of said internal groove, extend less steeply with respect to the axis of the coupling than said sloping sides of said flanges, whereby when the clamping ring is tensioned circumferentially, each said side wall of the groove engages the sloping side of the respective flange only along a continuous line of contact of the radiused part of the groove side wall with the respective flange.

6. The pipe coupling of claim 5 wherein the end faces of said flanges are normal to the first axes of the respective tubular parts.

7. The pipe coupling of claim 5 wherein the annular seal is a resilient element which has a radially outer channel, open on the radially inner side of the element, and has a restricted mouth defined between respective axially spaced apart side walls extending radially inwardly from axially extreme edges of said radially outer wall, and respective flanges extending towards each other from the radially inner edges of said side walls, whereby the annular seal, in axial section, has the form of a channel open on the radially inner side of the annular seal and having a restricted mouth defined between the free edges of said flanges of the annular seal, the last mentioned flanges forming the lips of said restricted mouth, the annular seal, in the assembled pipe coupling, being accommodated between the bottom of the groove in the clamping ring and the peripheral surfaces of the flanges of the tubular parts with each lip engaging the peripheral surface of the flange on a respective one of the tubular parts and with the junction between the flanges on the tubular parts being in the zone of the restricted mouth of the seal, whereby fluid under pressure within the tubular parts, escaping between the end faces of the flanges thereof will tend to inflate the seal and thus urge said lips even more firmly into sealing engagement with the peripheral surfaces of the flanges of the tubular parts, and wherein the end face of the flange of each tubular part is provided with at least one groove extending thereacross from the radially inner to the radially outer edge of the flange, said groove providing a passage for fluid within the tubular parts to the interior of the seal.

* * * * *